US012612941B2

(12) United States Patent
Schmidt

(10) Patent No.: US 12,612,941 B2
(45) Date of Patent: Apr. 28, 2026

(54) FIELD SERVICEABLE LANDING GEAR BUSHING

(71) Applicant: SAFRAN LANDING SYSTEMS CANADA INC., Ajax (CA)

(72) Inventor: Robert Kyle Schmidt, Brooklin (CA)

(73) Assignee: Safran Landing Systems Canada Inc., Ajax (CA)

( * ) Notice: Subject to any disclaimer, the term of this patent is extended or adjusted under 35 U.S.C. 154(b) by 491 days.

(21) Appl. No.: 16/795,302

(22) Filed: Feb. 19, 2020

(65) Prior Publication Data

US 2021/0254658 A1 Aug. 19, 2021

(51) Int. Cl.
| *F16C 17/02* | (2006.01) |
| *F16C 33/12* | (2006.01) |
| *B64C 25/00* | (2006.01) |

(52) U.S. Cl.
CPC .............. *F16C 17/02* (2013.01); *F16C 33/12* (2013.01); *B64C 25/001* (2013.01)

(58) Field of Classification Search
CPC ...... F16C 17/02; F16C 27/063; F16C 11/045; B60R 16/0215; B60R 16/0222; F16B 37/044; Y10T 403/32861
USPC ........................................................ 384/222
See application file for complete search history.

(56) References Cited

U.S. PATENT DOCUMENTS

| 1,031,410 | A | * | 7/1912 | Alexander | .............. | F16C 17/02 |
| | | | | | | 403/247 |
| 1,142,177 | A | * | 6/1915 | Kennedy | .................... | F16J 1/16 |
| | | | | | | 403/154 |
| 1,483,282 | A | * | 2/1924 | Coston | ..................... | B62D 7/18 |
| | | | | | | 403/150 |
| 1,674,453 | A | * | 6/1928 | Sloper | ..................... | F16C 17/18 |
| | | | | | | 384/292 |
| 1,700,100 | A | * | 1/1929 | Smith | ..................... | F16C 33/08 |
| | | | | | | 29/898.07 |
| 2,404,808 | A | * | 7/1946 | Lowey | .................... | F16C 43/02 |
| | | | | | | 29/898.059 |
| 2,608,751 | A | * | 9/1952 | Hutton | .................. | F16C 27/063 |
| | | | | | | 403/228 |

(Continued)

FOREIGN PATENT DOCUMENTS

DE 10 2007 010 692 A1 9/2008

OTHER PUBLICATIONS

International Search Report and Written Opinion mailed May 12, 2021, issued in corresponding International Application No. PCT/CA2021/050181, filed Feb. 18, 2021, 7 pages.

(Continued)

*Primary Examiner* — Emily M Morgan
(74) *Attorney, Agent, or Firm* — Christensen O'Connor Johnson Kindness PLLC

(57) ABSTRACT

A bushing is configured for installation in the hole of a lug, which has a protrusion extending radially inward from a surface of the hole. The bushing includes a first cylindrical body that is sized to be received within the hole of the lug. A flange extends radially outward from one end of the first cylindrical body, and a first recess is formed in the first cylindrical body to a radial face. The recess is sized and configured to receive the protrusion of the lug when the bushing is installed in the hole. Engagement of the protrusion with the recess preventing movement of the bushing relative to the lug.

5 Claims, 8 Drawing Sheets

(56) References Cited

U.S. PATENT DOCUMENTS

| | | | | |
|---|---|---|---|---|
| 2,683,637 A * | 7/1954 | Skillman, Jr. | F16C 17/10 | 384/299 |
| 2,815,253 A * | 12/1957 | Spriggs | F16C 33/208 | 384/909 |
| 3,033,623 A * | 5/1962 | Thomson | F16C 33/28 | 384/911 |
| 3,129,966 A * | 4/1964 | Blank | F16C 5/00 | 403/150 |
| 3,199,933 A * | 8/1965 | Rogerson | F16C 17/02 | 384/398 |
| 3,252,742 A * | 5/1966 | Swanstrom | F16C 33/20 | 384/206 |
| 3,317,256 A * | 5/1967 | Ernest | F16C 23/045 | 29/520 |
| 3,367,690 A * | 2/1968 | Federspill | F16C 11/045 | 403/224 |
| 3,372,960 A * | 3/1968 | Fisher | F16C 27/02 | 411/510 |
| 3,451,288 A * | 6/1969 | Russell | B60T 7/04 | 74/512 |
| 3,604,765 A * | 9/1971 | Babcock | F16C 23/04 | 384/220 |
| 3,904,299 A * | 9/1975 | Loonis | F16J 15/32 | 403/288 |
| 4,139,245 A * | 2/1979 | McCloskey | F16C 27/063 | 280/506 |
| 4,186,570 A * | 2/1980 | Pokrandt | F16D 9/06 | 464/33 |
| 4,441,601 A * | 4/1984 | Rood | B29C 66/545 | 193/37 |
| 4,509,870 A * | 4/1985 | Taki | F16C 33/208 | 384/298 |
| 4,878,795 A | 11/1989 | Woodrow et al. | | |
| 4,913,562 A * | 4/1990 | Rosen | F16C 33/20 | 384/301 |
| 5,271,476 A * | 12/1993 | Minamibata | B62D 5/22 | 92/169.1 |
| 5,388,915 A * | 2/1995 | Huber | B21K 25/00 | 384/295 |
| 5,658,079 A * | 8/1997 | Struziak | F16C 17/024 | 384/106 |
| 5,732,440 A * | 3/1998 | Wright | H02G 3/083 | 16/2.2 |
| 6,238,096 B1 * | 5/2001 | Allen | F16C 23/082 | 384/537 |
| 6,273,613 B1 * | 8/2001 | O'Brien | F16C 11/045 | 384/624 |
| 7,329,066 B2 | 2/2008 | Pineiros et al. | | |
| 8,375,587 B2 | 2/2013 | Gutknecht | | |
| 8,727,630 B2 * | 5/2014 | Guthrie | F16C 23/084 | 384/537 |
| 2004/0265054 A1 * | 12/2004 | Naudet | F16C 23/10 | 403/409.1 |
| 2005/0207686 A1 * | 9/2005 | Thibault | F16C 17/02 | 384/301 |
| 2005/0262682 A1 * | 12/2005 | Grover | B64C 5/06 | 29/428 |
| 2009/0028480 A1 * | 1/2009 | Krause | F16C 17/02 | 384/295 |
| 2015/0121836 A1 * | 5/2015 | Moreau | F16G 15/04 | 59/86 |
| 2016/0084297 A1 * | 3/2016 | Tormen | F16C 11/045 | 403/42 |
| 2016/0290391 A1 * | 10/2016 | Hill | F16C 11/045 | |
| 2017/0227047 A1 * | 8/2017 | Fujiwara | F16C 33/20 | |
| 2018/0340571 A1 | 11/2018 | Ayyagari | | |
| 2019/0277006 A1 * | 9/2019 | Stolz | B25B 27/06 | |
| 2019/0359344 A1 * | 11/2019 | Fabre | B64D 29/06 | |
| 2020/0309192 A1 * | 10/2020 | Jaeger | B32B 15/20 | |
| 2023/0128071 A1 * | 4/2023 | Bourque | F16C 43/02 | 16/2.1 |

OTHER PUBLICATIONS

Supplementary European Search Report mailed Jan. 29, 2024, issued in corresponding European Patent Application No. 21757076.1, filed Aug. 16, 2022, 9 pages.

* cited by examiner

FIELD SERVICEABLE LANDING GEAR BUSHING

BACKGROUND

Most machinery using pinned joints, including aircraft landing gear, utilize metallic bushings in the lugs to provide a replaceable wear surface. Such bushings are typically made from known bushing materials, such as bronze, which requires lubrication throughout the service life of the bushing. Other known bushings are "self-lubricating" bushings that do not require lubrication in the manner of known metallic bushings. These self-lubricating bushings are formed from thermoplastics, polytetrafluoroethylene (PTFE), or other suitable materials and have lubricant impregnated within the sliding layer of the bushing.

On aircraft landing gear, these bushings are generally installed with an interference fit, i.e., the outer diameter of the bushing is larger than the inner diameter of the lug in which the bushing is mounted. The interference fit provides improved fatigue characteristics and also prevents bushing migration. To insert the bushings with an interference fit, the bushings are shrunk in liquid nitrogen and/or the lugs are heated to expand the holes. Additionally, various compounds can be used (such as paint or adhesives) between the bushing and lug in order to further prevent bushing migration.

FIG. 1 shows an example of a conventional drag link assembly 20 of the type typically found on an aircraft nose landing gear. The drag link assembly 20 has an upper link 30 coupled to a lower link 50 via a universal joint assembly 40. More specifically, the upper link 30 and the lower link 50 are each rotatably coupled to the universal joint assembly 40 by a pinned connection that include greased metallic bushings 60, described below with reference to FIGS. 2 and 3.

Referring now to FIGS. 2 and 3, the pinned connection of the upper link 30 to the universal joint assembly 40 and components thereof are shown. The upper link 30 includes a pair of parallel lugs 32, each having a hole 34 extending therethrough. The holes 34 are coaxial, and each hole is provided with a flanged bushing 60 installed with an interference fit. Each flanged bushing 60 includes a cylindrical body 62 (FIG. 3) extending through the hole 34 in the lug 32 and an outwardly extending radial flange 64 positioned against an inner face of the lug in which the bushing is installed. Lubrication fittings 36 (FIG. 2) are installed in the upper link 30 and are in fluid connection with the bushings 60 to enable the introduction of a lubricant, such as grease, to the bushings.

Referencing FIG. 2, the universal joint assembly 40 includes a pair of parallel lugs 42 sized and configured to be positioned between the lugs 32 of the upper link 30. Similar to the lugs 32 of the upper link 30, the lugs 42 of the universal joint assembly 40 have coaxial holes 44 with flanged bushings 60 installed therein. The bushings 60 in the universal joint assembly lugs 42 are oriented such the flange 64 (FIG. 3) of each bushing 60 is positioned against the outer surface of its respective lug 42. As a result, when the joint is assembled, the flange 64 of each bushing 60 in the upper links lug 32 is adjacent to the flange 64 of the bushing 60 in the corresponding universal joint assembly lug 42. The universal joint assembly 40 also includes lubrication fittings 46 to enable the bushings 60 to be lubricated.

A pin 80 extends through the lugs 32 and 42 of the upper link 30 and the universal joint assembly 40, respectively. In operation, the bushings 60 provide lubricated, replaceable wear surfaces that slidingly engage the pin 80 to allow rotation of the upper link 30 relative to the universal joint assembly 40.

With reference to FIG. 3, a lubrication track 68 is formed in an inner surface 66 of the bushing body 62 and extends circumferentially around the inner surface. A plurality of axial pathways 70 are formed in the inner surface 66 and extend in an axial direction from the grease track 68. One or more radial apertures (not shown) are formed in the body 62 of the bushing 60 and at least one of the apertures is in fluid connection with the lubrication track 68 and the lubrication fitting 36 shown in FIG. 2. Lubrication provided through the lubrication fitting travels through the apertures into the lubrication track 68 and pathways 70 to lubricate the interface between the pin 80 and the inner surface 66 of the bushing 60.

Throughout the service life of the bushings, the inner diameter of each bushing increases due to wear, and the bushings must be removed and replaced. Servicing worn bushings is time and labor intensive. Because of the interference fit between the bushing and the lug in which the bushing is installed, the removal and replacement of the bushing must typically be performed in a shop environment. Removal of the bushing often requires that the bushing be cut out, machined out, or forced out under great mechanical force. The removal process can damage the lug, requiring that lug be reworked and re-protected before the new bushing is inserted.

SUMMARY

In accordance with a first representative embodiment of a bushing assembly, the bushing is configured for installation in the hole of a lug, which has a protrusion extending radially inward from a surface of the hole. The bushing includes a first cylindrical body that is sized to be received within the hole of the lug. A flange extends radially outward from one end of the first cylindrical body, and a first recess is formed in the first cylindrical body to define a radial face. The recess is sized and configured to receive the protrusion of the lug when the bushing is installed in the hole. Engagement of the protrusion with the recess prevents movement of the bushing relative to the lug.

In an embodiment, engagement of the radial face with the protrusion prevents movement of the bushing in a first direction relative to the lug.

In an embodiment, engagement of the flange with the protrusion prevents movement of the bushing in a second direction relative to the lug.

In an embodiment, the bushing further includes a slot extending along a surface of the first cylindrical body.

In an embodiment, the bushing further includes a second cylindrical body positioned proximate to a second end of the first cylindrical body.

In an embodiment, the first cylindrical body comprises a first material having a first elastic modulus and the second cylindrical body comprises a second material having a second elastic modulus greater than the first elastic modulus.

In an embodiment, the bushing further includes an annular spacer disposed between the first cylindrical body and the second cylindrical body, wherein the annular spacer comprises an electrically conductive material.

In an embodiment, the bushing further includes the lug with a second protrusion extending radially inward from the surface of the hole. A second cylindrical body of the bushing further comprises a second radial face. Engagement of the second radial face with the second protrusion prevents axial movement of the second cylindrical body relative to the lug.

In accordance with a second representative embodiment of a bushing assembly, the bushing is configured for installation in a hole of a lug. The lug includes a first protrusion extending radially inward from a surface of the hole. The bushing includes a first portion that has a first cylindrical body sized to be received within the hole of the lug and a flange extending radially outward from one end of the first cylindrical body. The first portion further includes a first recess formed in the first cylindrical body and a second protrusion extending radially from an outer surface of the first cylindrical body. The bushing also includes a second portion having a second cylindrical body with a second recess formed therein. The second portion further includes a third protrusion extending radially from an outer surface of the second cylindrical body. The second protrusion engages the second recess, and the third protrusion engages the first recess to prevent movement of the first portion relative to the second portion.

In an embodiment, the first portion and second portion cooperate to form a third recess, the first protrusion engaging the third recess when the bushing is installed to prevent movement of the bushing relative to the lug.

In an embodiment, the flange defines a first radial face of the third recess, engagement of the first radial face with the first protrusion preventing movement of the bushing relative to the lug in a first direction.

In an embodiment, the second portion defines a second radial face of the third recess, engagement of the second radial face with the first protrusion preventing movement of the bushing relative to the lug in a second direction.

In an embodiment, the first portion comprises a first material having a first elastic modulus, and the second portion comprises a second material having a second elastic modulus greater than the first elastic modulus.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of bushing installations are set forth below according to technologies and methodologies of the present disclosure. The described bushings include a locking feature that prevents migration of the bushing within the lug while also providing for less labor-intensive bushing replacement.

Figure 1:
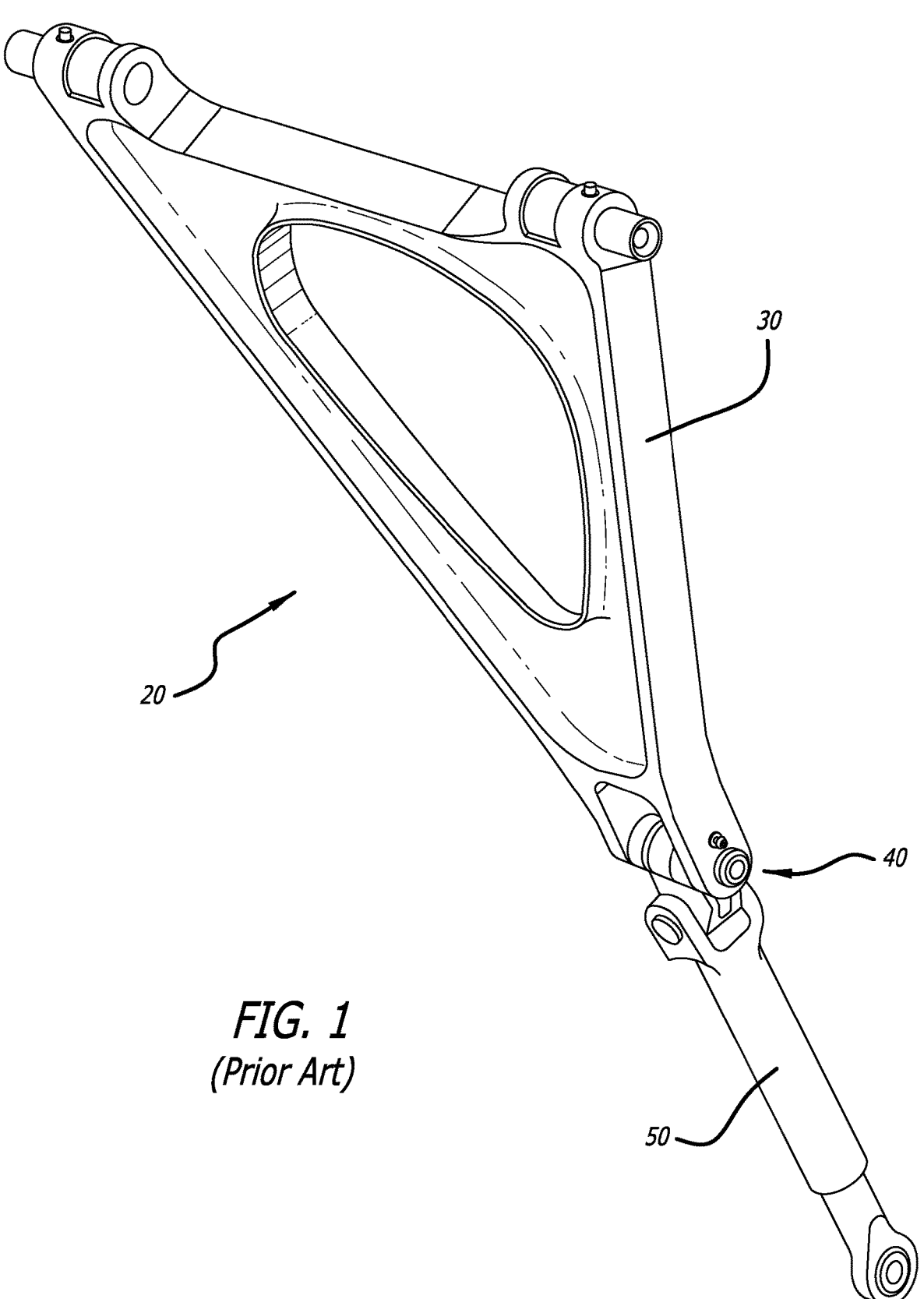
FIG. 1 shows an isometric view of a conventional drag brace linkage of an aircraft.
Figure 2:
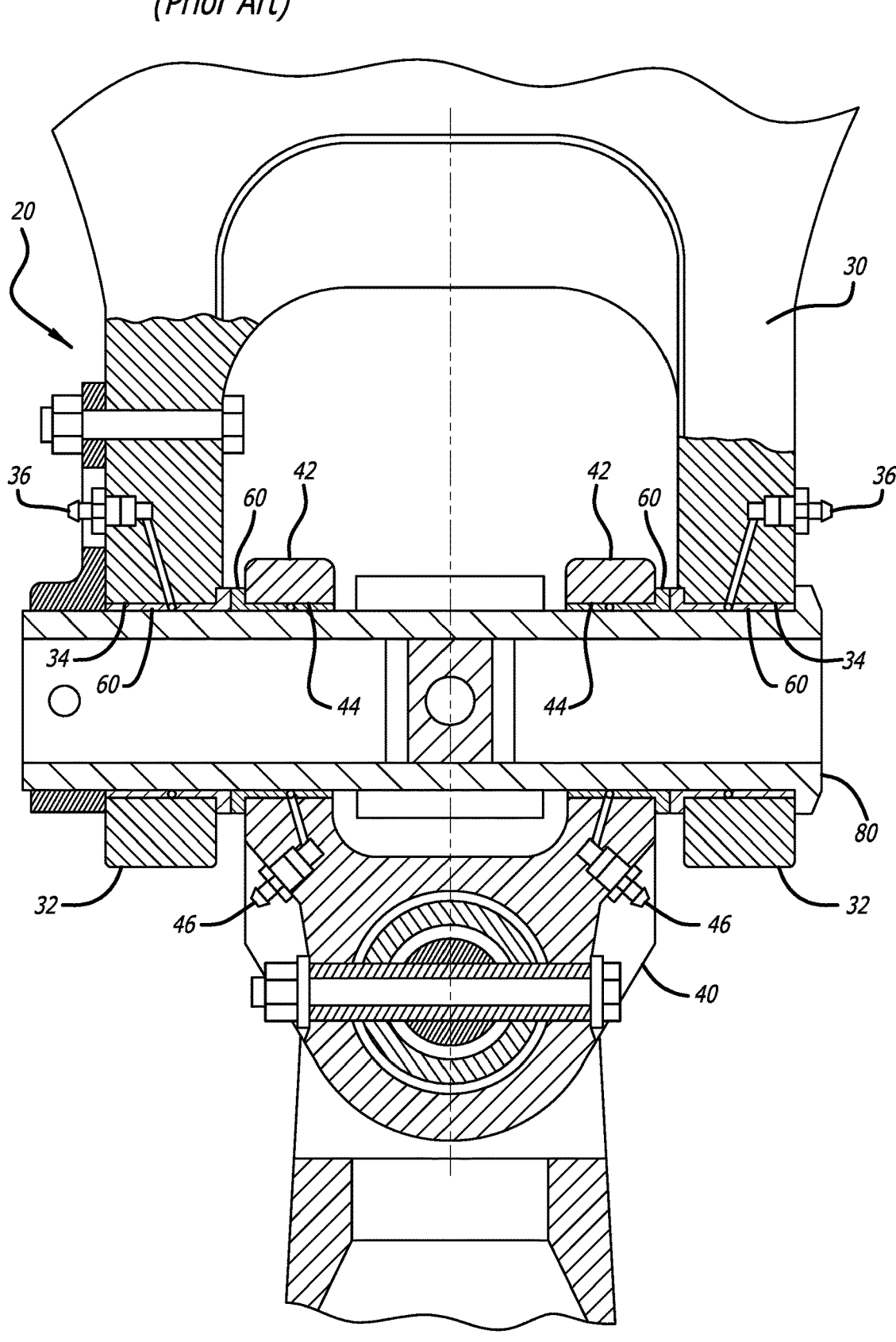
FIG. 2 shows a cross-sectional view of a known rotational joint of the drag brace linkage in FIG. 1.
Figure 3:
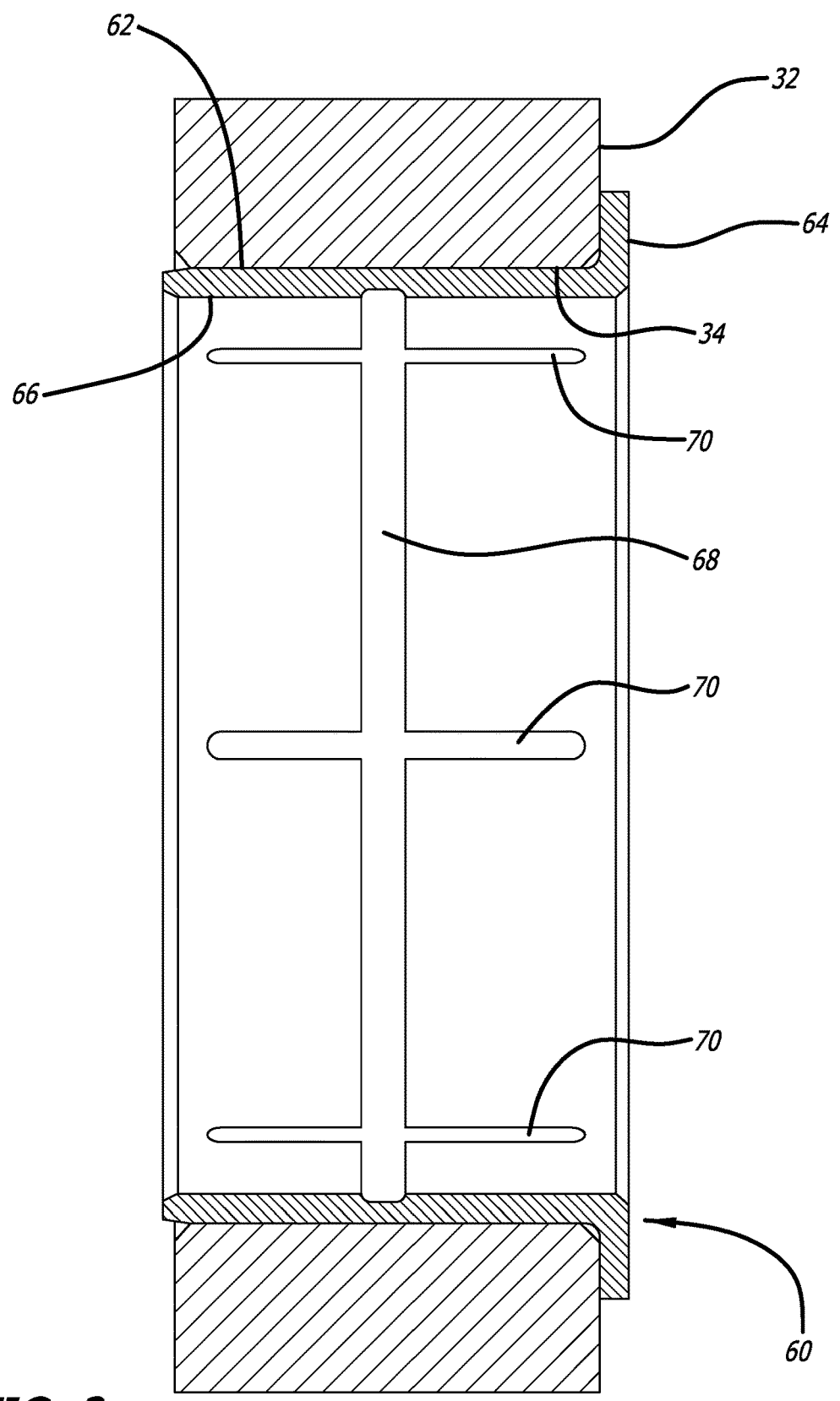
FIG. 3 shows a cross-sectional view of a flanged bushing of the rotational joint shown in FIG. 2.
Figure 4:
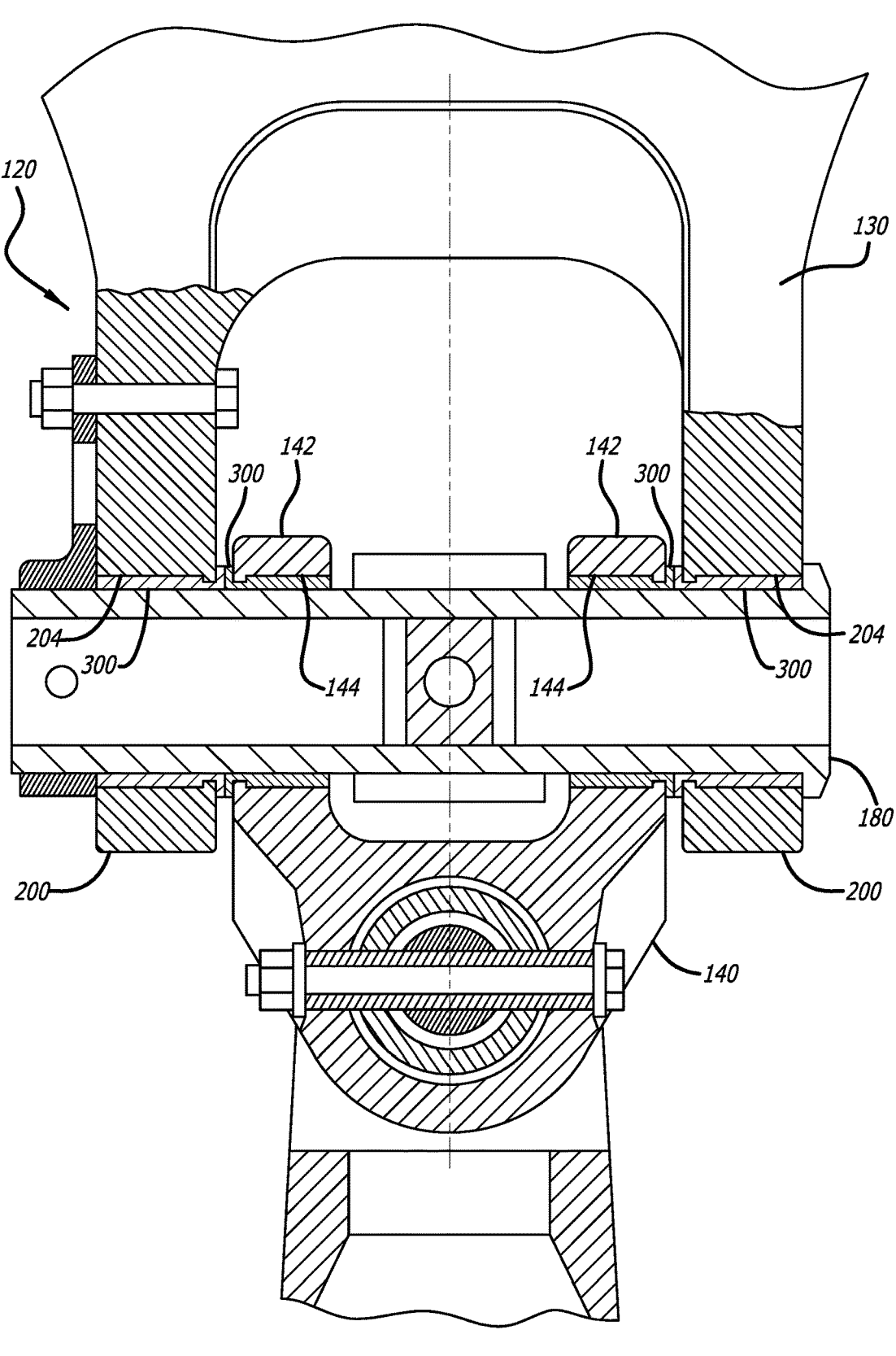
FIG. 4 shows a cross-sectional view of a representative embodiment of a rotational joint according to the present disclosure, wherein the rotational joint is suitable for use with the drag brace linkage in FIG. 1.
Figures 5, 6:
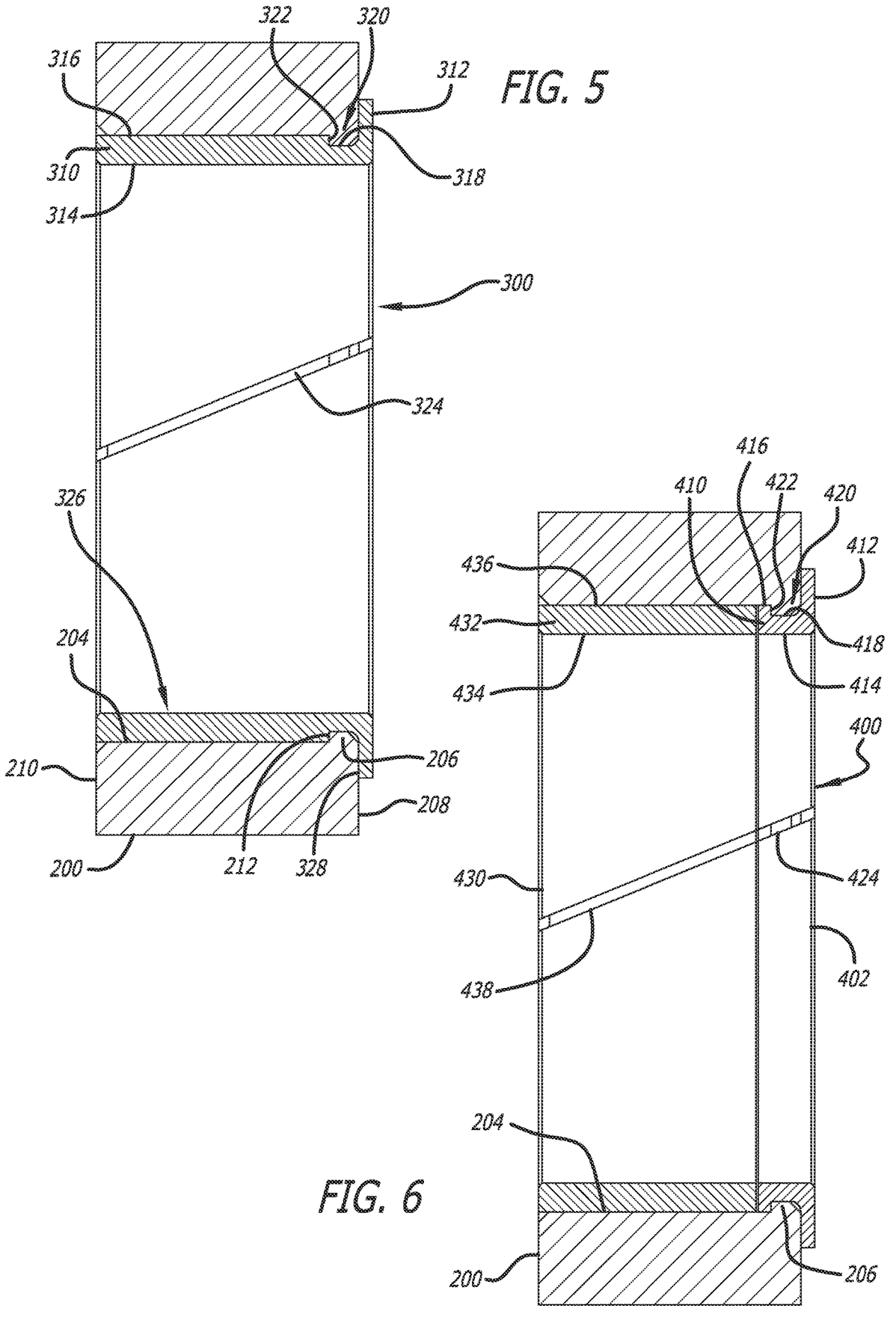
FIG. 5 shows a cross-sectional view of a first representative embodiment of a flanged bushing of the rotational joint shown in FIG. 4.
FIG. 6 shows a cross-sectional view of a second representative embodiment of the flanged bushing of the rotational joint shown in FIG. 4.

FIGS. 4 and 5 show a pinned joint that uses flanged bushings 300 according to a first representative embodiment of the present disclosure. The illustrated joint 120 is similar to the joint shown in FIGS. 2 and 3, wherein components of the joint shown in FIG. 4 that are labeled with reference number 1XX correspond to similar components labeled with reference number XX in FIG. 2, except as noted. For example, the drag link assembly 120 shown in FIG. 4 is similar to the drag link assembly 20 shown in FIG. 2 unless otherwise described.

As will be described in more detail below, the flanged bushings 300 include locking features that retain the bushings within the lugs 200 of the upper link 130 without the interference fit required by known metallic bushings. In addition, the bushings 300 in some embodiments are "self-lubricating" bushings that do not require lubrication in the manner of known metallic bushings, so lubrication fittings 36, grease tracks 68, 70, etc. are not necessary. In some embodiments, the flanged bushings 300 are formed from thermoplastics, polytetrafluoroethylene (PTFE), or any other known material suitable for self-lubricating bushings, or combination thereof. The bushings may also include electrically conductive materials integrally formed with the bushings, i.e., fillers, and/or electrically conductive coatings. In this regard, the disclosed bushings 300 may be formed from any material or combination of materials that have a sufficiently low friction coefficient, as well as suitable strength, durability, and elasticity.

FIG. 5 depicts a cross-sectional view of a representative embodiment of a bushing 300 according to the present disclosure installed in a representative embodiment of a lug 200. The lug 200 includes a first planar surface 208 parallel to a second planar surface 210. A hole defines a generally cylindrical inner surface 204. Unlike the conventional lugs 32 and 42 shown in FIG. 2, the lug 200 shown in FIG. 5 has a protrusion 206 that extends radially inward along the circumference of the hole at one end of inner surface 204, proximate to the first planar surface 208 face of the lug 200. The protrusion 206 defines a planar inner surface 212. In the illustrated embodiment, the protrusion 206 has a generally trapezoidal shape, however, this shape is exemplary only and should not be considered limiting. Other contemplated embodiments of the protrusion have a cross-section in the shape of a square, a rectangle, a semicircle, or any other suitable shape. Further, embodiments in which the protrusion extends along only a portion of the circumference of the hole, or several protrusions positioned at intervals along the circumference of the hole, are possible.

Still referring to FIGS. 4 and 5, the bushing 300 includes a generally cylindrical body 310 with a 5 flange 312 extending radially outward at one end along the circumference of the body. The body 310 has a cylindrical aperture 326 with an inner surface 314 sized to receive a pin 180 and an outer surface 316 sized to be received within the inner surface 204 of the hole. In one embodiment, the outer surface 316 is sized to have an interference fit with the hole of the lug 200, however, it will be appreciated that an interference fit is not necessary 10 to retain the bushing 300 within the hole.

Referencing FIG. 5, the bushing 300 has a recess 320 formed in the outer surface 316 proximate to the flange 312 of the bushing. The recess 320 is defined by a second outer surface 318 that has a smaller diameter than the outer surface 316 of the body 310. Radial walls of the recess 320 are defined by a radial face 322 and an inner face of the flange 312. The recess 320 is sized and configured such that when the bushing is installed in the lug 200, the protrusion 206 of the lug extends into the recess. When the protrusion 206 is so positioned, migration of the bushing 300 is prevented. Specifically, a planar flange face 328 (of the flange 312) engages a face (first planar surface 208) of the lug 200 and the protrusion 206 to prevent migration of the bushing 300 in a first direction (further into the lug), and the radial face 322 of the recess 320 engages the planar inner surface 212 of the protrusion 206 to prevent migration of the bushing 300 in a second direction (out of the lug).

In one embodiment, the bushing 300 is mounted to the lug with an interference fit. In such cases, because the bushing 300 is an elastic self-lubricated bushing, the body 310 of the bushing can be compressed to have an outer diameter smaller than the hole in the lug and then released after insertion to expand to match the diameter of hole in the lug. In the illustrated embodiment, the bushing 300 includes a spiral slot 324 formed along the body 310 and, possibly, the flange. Other embodiments are contemplated in which the slot 324 has different lengths, widths, and/or shapes. Still other embodiments do not include a slot. When present, the slot 324 facilitates compression of the bushing 300 during installation. In other embodiments, the bushing 300 is bonded into the lug by an adhesive in addition to or in lieu of an interference fit.

In one contemplated embodiment, removal of the bushing 300 is accomplished by disassembly of the pin and then deforming the bushing such that the protrusion 206 disengages from the recess 320. In one embodiment, the deformation is accomplished by the use of a prying tool inserted between the bushing 300 and the inner surface 204 of the hole in the lug.

FIG. 6 shows another embodiment of a bushing 400 in accordance with the disclosure. As shown in FIG. 6, the bushing 400 includes a first portion 402 and a second portion 430. The first portion 402 is similar to the previously described bushing 300 shown in FIGS. 4 and 5. In this regard, the first portion 402 includes a generally cylindrical body 410 with a flange 412 extending radially outward at one end along the circumference of the body. The body 410 has an inner surface 414 sized to receive the pin 180 and an outer surface 416 sized to be received within the hole. In one embodiment, the outer surface 416 is sized to have an interference fit with the hole of the lug 200, however, it will be appreciated that an interference fit is not necessary to retain the first portion 402 within the hole.

A recess 420 is formed in the outer surface 416 of the first portion 402 proximate to the flange 412 of the bushing. The recess 420 is defined by a second outer surface 418 that has a smaller diameter than the outer surface 416. Radial walls of the recess 420 are defined by a radial face 422 and an inner face of the flange 412. The recess 420 is sized and configured such that when the bushing is installed in the lug 200, the protrusion 206 of the lug extends into the recess. When the protrusion 206 is so positioned, migration of the first portion 402 is prevented. Specifically, the flange 412 engages a face of the lug 200 and the protrusion 206 to prevent migration of the first portion 402 in a first direction (further into the lug), and a radial face 422 of the recess 420 engages the protrusion 206 to prevent migration of the first portion 402 in a second direction (out of the lug).

The first portion 402 of bushing 400 extends only partway into the hole (inner surface 204) of the lug 200. In the illustrated embodiment, the body 410 of the first portion 402 extends beyond the width of the recess 420 so that the distance between the end of the body and the radial face 422 is approximately the same as the thickness of the flange 412. It will be appreciated that the illustrated length of the body 410 is exemplary only, and other embodiments in which the body is longer or shorter are possible and should be considered within the scope of the present disclosure.

Still referring to FIG. 6, the second portion 430 of the bushing 400 has a cylindrical body 432 with an outer surface 436 having a diameter corresponding to that of the inner surface 204 of the hole of the lug 200. An inner surface 434 of the second portion 430 has a diameter corresponding to that of the inner surface 414 of the first portion 402. The second portion 430 is sized to extend from the end of the first portion to the face of the lug 200 opposite the flange 412 of the first portion 402. Thus, the first and second portions 402 and 430 cooperate to extend along the width of the lug 200.

In the illustrated embodiment, the first and second portions 402 and 430 of the bushing 400 include spiral slots 424 and 438, respectively to facilitate installation of the bushing parts. It will be appreciated that other embodiments are possible in which one or both slots are omitted, and such embodiments should be considered within the scope of the present disclosure.

In an embodiment of the bushing 400, the first and second portions 402 and 430 are made from the same materials. In other embodiments, the first and second portions 402 and 430 are made from different materials. In one embodiment, one of the portions is made from an electrically insulating material, and the other portion is made from an electrically conductive material. In yet another embodiment, the first portion 402 is made from a material having a low elastic modulus, and the second portion 430 is made from a material with a high elastic modulus. The low elastic modulus of the first portion 402 reduces stress in the flange 412 cause by forces imparted by the pin.

Figure 7:
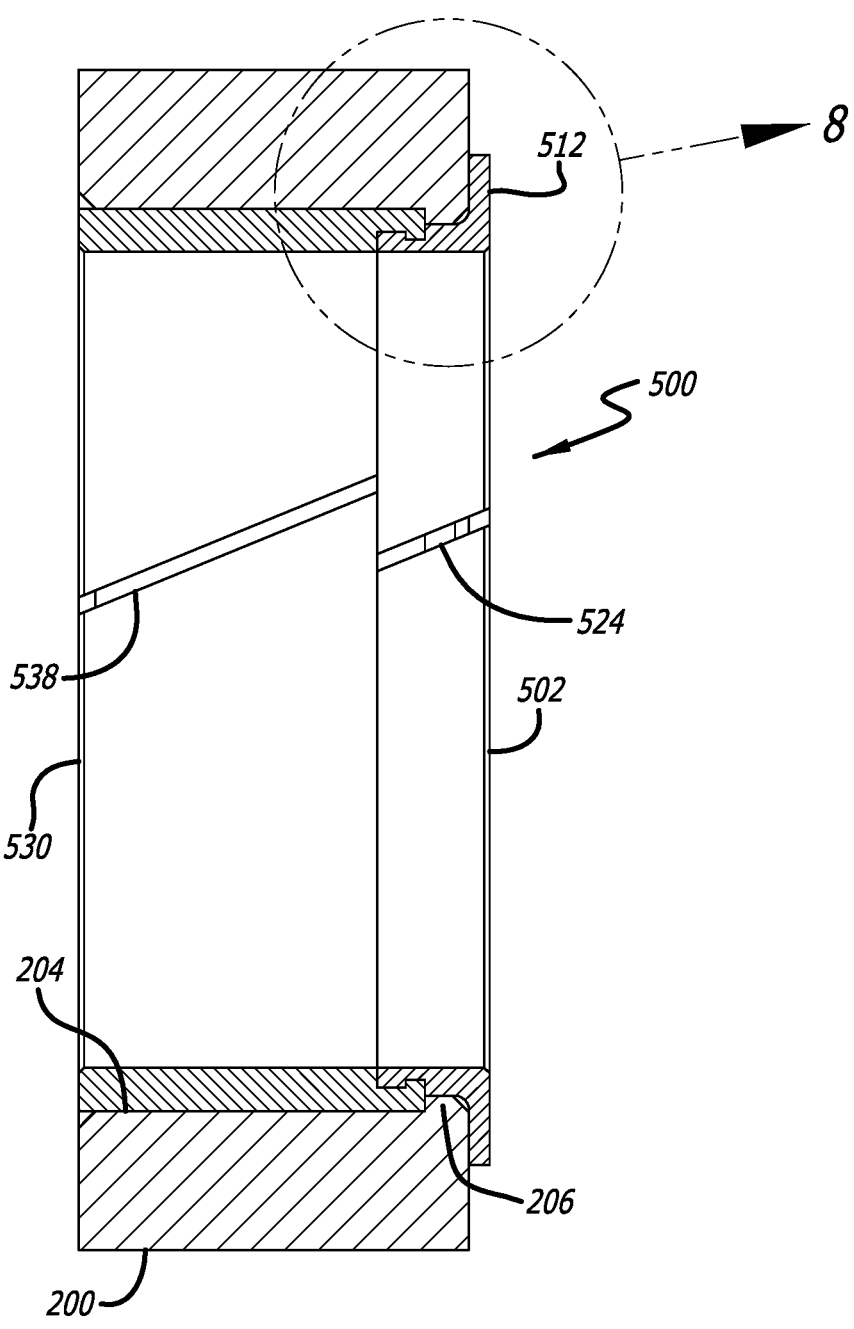
FIG. 7 shows a cross-sectional view of a third representative embodiment flanged bushing of the rotational joint shown in FIG. 4.
Figure 8:
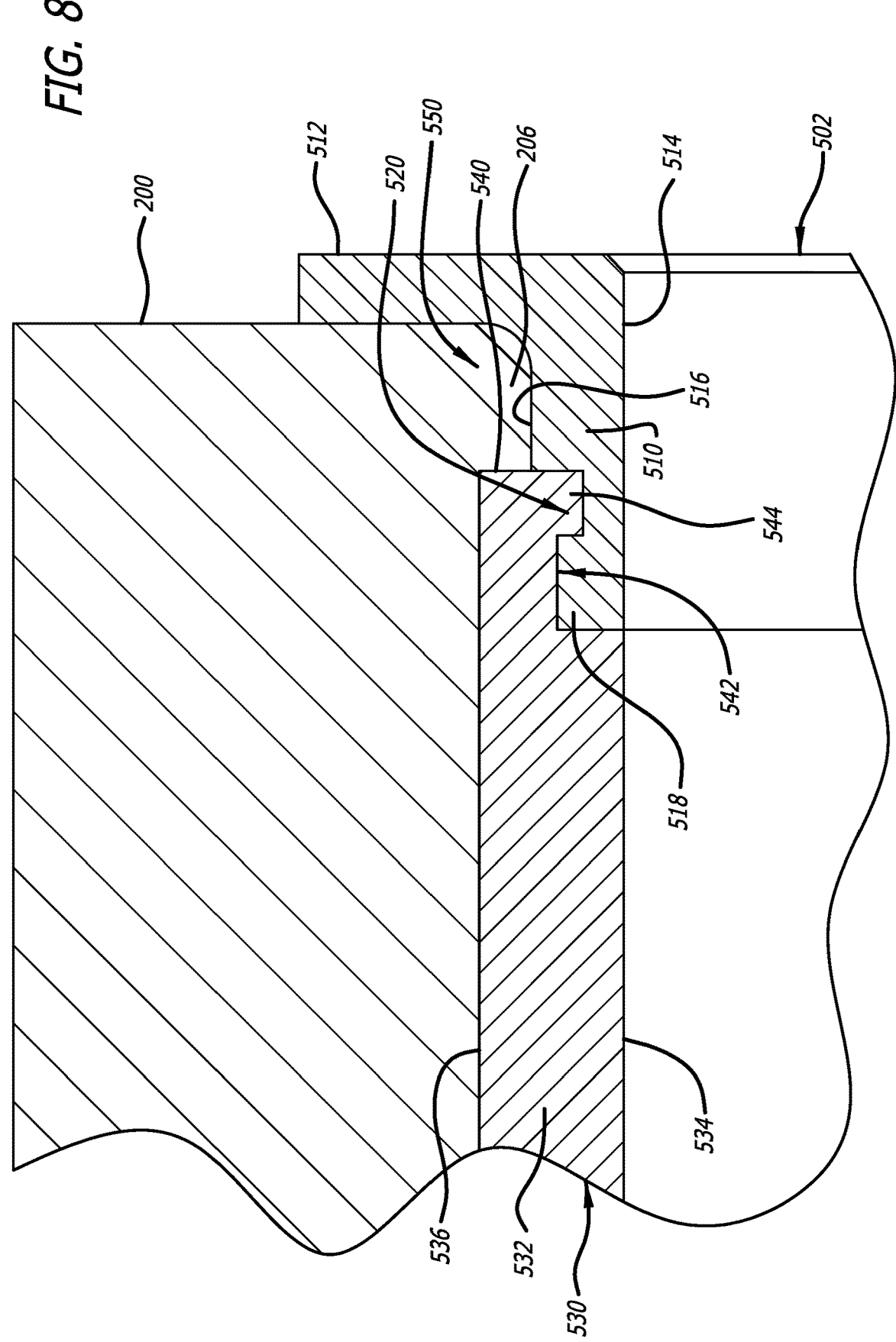
FIG. 8 shows an enlarged, partial cross-sectional view of the flanged bushing shown in FIG. 7.

FIGS. 7 and 8 illustrate another embodiment of a bushing 500 in accordance with the disclosure. As shown in FIGS. 7 and 8, the bushing 500 includes a first portion 502 and a second portion 530 similar to the bushing 400 shown in FIG. 6. However, unlike bushing 400, the first and second portions 502 and 530 of bushing 500 lockingly engage each other when installed.

The first portion 502 includes a generally cylindrical body 510 with a flange 512 extending radially outward at one end along the circumference of the body. The body 510 has an inner surface 514 sized to receive the pin 180 and an outer surface 516.

The second portion 530 of the bushing 500 includes a cylindrical body 532 with an outer surface 536 having a diameter corresponding to that of the inner surface 204 of the hole of the lug 200. An inner surface 534 of the second portion 530 has a diameter corresponding to that of the inner surface 514 of the first portion 502.

When installed in the lug 200, the second portion 530 lockingly engages the first portion 502 and extends to the face of the lug 200 opposite the flange 512 of the first portion 502. Thus, the first and second portions 502 and 530 cooperate to extend along the width of the lug 200.

As shown in FIG. 8, the first portion 502 includes a protrusion 518 extending radially outward and a recess 520 extending radially inward. The second portion 530 includes a protrusion 544 extending radially inward and a recess 542 extending radially outward. When the bushing 500 is installed, the first portion 502 and the second portion 530 overlap such that the protrusion 518 of the first portion 502 is received within the recess 542 of the second portion 530, and the protrusion 544 of the second portion 530 is received within the recess 520 of the first portion 502. When installed, the overlapping areas of the first and second portions 502 and 530 are sandwiched between the inner surface 204 of the hole of the lug 200 and the pin 80 so that the protrusion of each portion is prevented from disengaging with the corresponding recess of the other portion, and the locking engagement of the first and second portions is maintained.

While the illustrated embodiment of the bushing 500 shows the protrusion 518 of the first portion 502 extending radially outward to engage the recess 542 of the second portion 530 and the protrusion 544 of the second portion extending radially inward to engage the recess 520 of the first portion, it will be appreciated that the position and orientation of the recesses and protrusions are exemplary only. Other embodiments are possible in which the protrusion of the first portion extends radially inward and/or the protrusion of the second portion extends radially outward. These and other alternate locking features are contemplated and should be considered within the scope of the present disclosure.

Still referring to FIG. 8, the first and second portions 502 and 530 cooperate to form a recess 550 that receives the protrusion 206 of the lug 200 to prevent migration of the bushing 500. More specifically, the recess 520 is defined by an end face 540 of the second portion 530, the outer surface 516 of the first portion 502, and an inner face of the flange 512. When the bushing 500 is installed in the lug 200, the protrusion 206 of the lug extends into the recess 550. The flange 512 engages a face of the lug 200 and the protrusion 206 to prevent migration of the bushing 500 in a first direction (further into the lug), and the end face 540 of the second portion 530 engages the protrusion 206 to prevent migration of the bushing 500 in a second direction (out of the lug).

In the illustrated embodiment, the first and second portions 502 and 530 of the bushing 500 include spiral slots 524 and 538, respectively to facilitate installation of the bushing parts. It will be appreciated that other embodiments are possible in which one or both slots are omitted, and such embodiments should be considered within the scope of the present disclosure.

In an embodiment of the bushing 500, the first and second portions 502 and 530 are made from the same materials. In other embodiments, the first and second portions 502 and

530 are formed from different materials. In one embodiment, one of the portions is made from an electrically insulating material, and the other portion is made from an electrically conductive material. In yet another embodiment, the first portion 502 is formed from a material having a low elastic modulus, and the second portion 530 is formed from a material with a high elastic modulus. The low elastic modulus of the first portion 502 reduces stress in the flange 512 cause by forces imparted by the pin.

Figure 9:
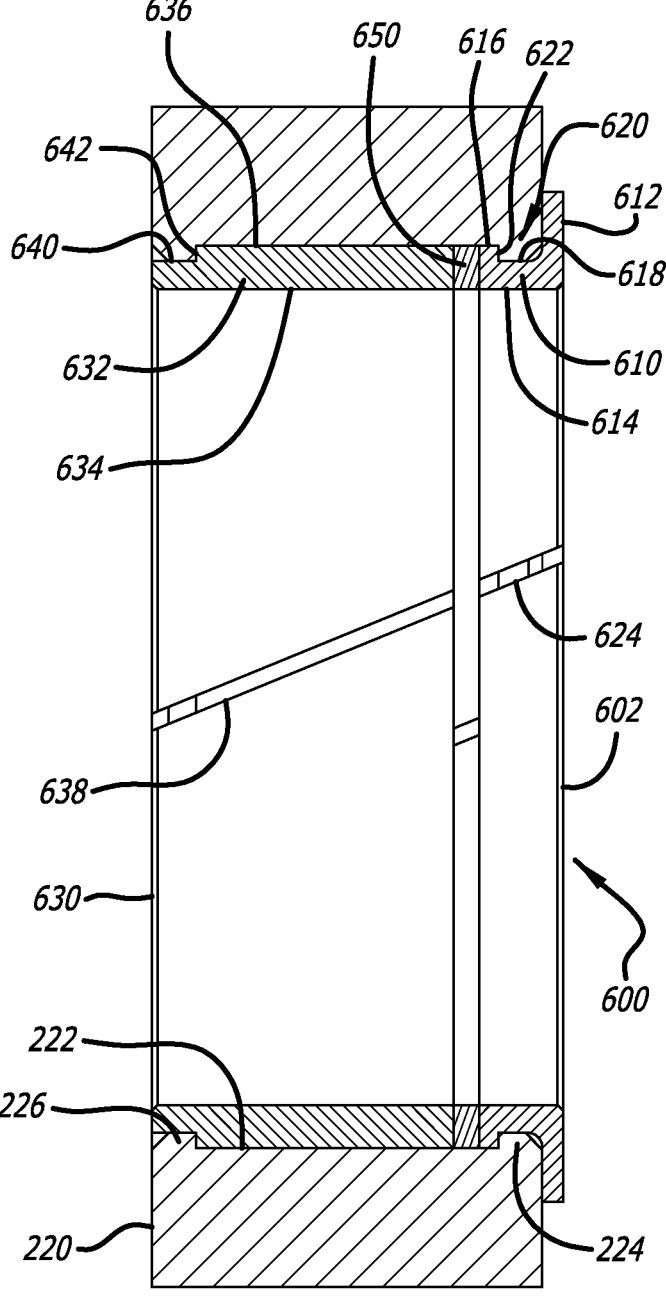
FIG. 9 shows a cross-sectional view of a fourth representative embodiment flanged bushing of the rotational joint shown in FIG. 4.

Referring now to FIG. 9, an embodiment of a three-piece bushing 600 is shown. The bushing 600 is installed in a lug 220, also shown in FIG. 9. The lug 220 is similar to the previously described lug 200, having a hole defined by a cylindrical inner surface 222 and a first protrusion 224 extending radially inward from the inner surface at one end of the hole. The lug 220 further includes a second protrusion 226 extending radially inward from the inner surface 222 at a second end of the hole.

The bushing 600 includes a first portion 602, a second portion 630, and a conductive spacer 650. The first portion 602 shown in FIG. 9 is similar to the previously described first portion 402 shown in FIG. 6, wherein features of first portion 602 labeled with reference numbers 6XX correspond to features of first portion 402 labeled with reference numbers 4XX. For the sake of brevity, the first portion 602 of the bushing 600 will not be described, with the understanding that unless otherwise noted, the features of the first portion 602 are identical or similar to those of previously described first portion 402.

Still referring to FIG. 9, the second portion 630 of the bushing 600 includes a cylindrical body 632 with an outer surface 636 having a diameter corresponding to that of the inner surface 222 of the hole of the lug 220. An inner surface 634 of the second portion 630 has a diameter corresponding to that of the inner surface 614 of the first portion 602.

A step is located at one end of the second portion 630. The step is defined by a cylindrical second outer surface 640 and a radial face 642. The second outer surface 640 has a smaller diameter than the outer surface 636, and the radial face 642 extends from the second outer surface 640 to the outer surface 636. The second outer surface 640 and the radial face 642 are sized and configured to engage the second protrusion 226 of the lug 220 when the bushing 600 is installed so that the contact between the second protrusion 226 and the radial face 642 prevents the second portion 630 from migrating out of the lug 220.

The first and second portions 602 and 630 are sized to define a gap therebetween when installed in the lug 220. The annular spacer 650 is sized and configured to fill the gap. The spacer 650 is formed from a conductive material, such as a metal, to provide electrical bonding and lightning strike resistance in the joint. In one embodiment, the spacer 650 is formed from a relatively soft material, such as a copper alloy, which reduces the amount of joint load reacted by the spacer. In another embodiment, the annular spacer 650 is a wave washer, also known as a spring washer, which provides a preload that maintains contact between the second protrusion 226 and the radial face 642 of the second portion 630. In still other embodiments, the annular spacer 650 takes any suitable form that is conductive. In this regard, the annular spacer 650 may be formed at least in part from a conductive material. In other contemplated embodiments, the annular spacer 650 is an elastomeric O-ring or seal shaped formed with conductive fillers.

In the illustrated embodiment, the first and second portions 602 and 630 of the bushing 600 include spiral slots 624 and 638, respectively to facilitate installation of the bushing parts. It will be appreciated that other embodiments are possible in which one or both slots are omitted, and such embodiments should be considered within the scope of the present disclosure.

Embodiments of the disclosed bushing are described with reference to the drag brace of an aircraft landing gear: however, it will be appreciated that the bushings are not limited to a drag brace, and the bushings are suitable for use with other pinned joints that utilize flanged bushings to react radial and axial loads and/or provide replaceable wear surfaces.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A bushing installation, comprising:
a lug, comprising:
　a first planar surface opposite a second planar surface;
　a hole extending from the first planar surface to the second planar surface; and a protrusion extending radially inward from a surface of the hole, the protrusion defining a planar inner surface disposed within the hole and parallel to the first planar surface; and
a bushing mounted to the lug, the bushing comprising:
　a first body completely disposed within the hole of the lug and having a cylindrical aperture extending therethrough, a length of the first body being equal to a distance between the first planar surface and the second planar surface;
　a flange extending radially outward from a first end of the first body and defining a planar flange face contacting and coplanar with the first planar surface; and
　a first annular recess formed in the first body, the first annular recess defining a radius and a radial face parallel to and offset from the planar flange face, wherein the protrusion is received within the first recess, engagement of the protrusion with the radial face and with the planar flange face preventing axial movement of the bushing relative to the lug,
wherein an outer surface of the first body has a constant radius from the first annular recess to a second end of the first body opposite the flange, the outer surface being in contact with the hole from the first annular recess to the second planar surface of the lug,
wherein the radius of the first annular recess is less than the constant radius.

2. The bushing installation of claim 1, wherein engagement of the radial face of the recess with the planar inner surface of the protrusion prevents movement of the bushing in a first axial direction.

3. The bushing installation of claim 2, wherein engagement of the planar flange face with the first planar surface of the lug prevents movement of the bushing in a second axial direction.

4. The bushing installation of claim 1, further comprising a slot extending through the outer surface of the first body from at least the flange to the second end of the first body.

5. The bushing of claim 1, wherein the bushing is elastically deformable and configured such that the protrusion contacts the first body to elastically deform the bushing as the bushing is being mounted to the lug.

\* \* \* \* \*